US008661348B2

(12) United States Patent
Wollmershauser et al.

(10) Patent No.: US 8,661,348 B2
(45) Date of Patent: Feb. 25, 2014

(54) METHODS AND SYSTEMS TO PROCESS AN IMAGE

(75) Inventors: Steven M. Wollmershauser, San Antonio, TX (US); Yolius Diroo, San Antonio, TX (US); Edward Walter, Boerne, TX (US); Aaron Bangor, Austin, TX (US); Marc Sullivan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1337 days.

(21) Appl. No.: 11/341,058

(22) Filed: Jan. 27, 2006

(65) Prior Publication Data

US 2007/0177188 A1 Aug. 2, 2007

(51) Int. Cl.
*G06F 3/00* (2006.01)
*G06F 17/00* (2006.01)
*G06F 21/00* (2013.01)
*G06F 12/00* (2006.01)

(52) U.S. Cl.
USPC ........... 715/744; 715/201; 715/751; 715/866; 725/41; 705/51; 705/901; 707/821

(58) Field of Classification Search
USPC .......... 386/121; 725/41; 705/51, 901, 903, 58
See application file for complete search history.

(56) References Cited

U.S. PATENT DOCUMENTS

| 4,603,966 | A | * | 8/1986 | Brownstein ..................... 355/45 |
| 4,858,032 | A | * | 8/1989 | Okada et al. ..................... 360/91 |
| 5,262,860 | A | * | 11/1993 | Fitzpatrick et al. ........... 348/461 |
| 5,715,403 | A | * | 2/1998 | Stefik ............................... 705/44 |
| 5,881,287 | A | * | 3/1999 | Mast ............................... 717/127 |
| 6,139,197 | A | * | 10/2000 | Banks ............................. 709/217 |
| 6,223,213 | B1 | * | 4/2001 | Cleron et al. ................. 709/206 |

(Continued)

FOREIGN PATENT DOCUMENTS

| JP | 2002019235 | 2/2002 |
| JP | 2002094917 | 3/2002 |
| JP | 2003163895 | 6/2003 |

OTHER PUBLICATIONS

Microsoft Computer Dictionary, May 1, 2002, Microsoft Press, Fifth Edition.*

*Primary Examiner* — Nicholas Ulrich
(74) *Attorney, Agent, or Firm* — Guntin & Gust, PLC; Jay H. Anderson (57) ABSTRACT

According to a first aspect there is provided a method for associating a file that contains the image with a second file that is identified by input received at a set-top box from a user. According to a second aspect there is provided a method for capturing an image that is displayed on a display device that is associated with the set-top box; and communicating the image over a network. According to a third aspect there is provided a method for adjusting a frame that is displayed on a display device that is associated with the set-top box; capturing an image that is displayed inside the frame on the display device; and processing the image. According to a fourth aspect there is provided a method for capturing an image displayed on a display device associated with the set-top box; associating the image with a rule; and processing the rule to prevent the image from being printed. According to a fifth aspect there is provided a method for communicating content that is received at a set-top box; and communicating a rule to prevent an image, that is captured from the content at the set-top box, from being printed.

12 Claims, 9 Drawing Sheets

(56) References Cited

U.S. PATENT DOCUMENTS

| | | | |
|---|---|---|---|
| 6,636,329 B2 * | 10/2003 | Koppich et al. | 358/1.15 |
| 6,912,002 B1 * | 6/2005 | Soga | 348/231.2 |
| 6,930,788 B1 | 8/2005 | Iwamoto et al. | |
| 6,963,858 B2 * | 11/2005 | Wang et al. | 705/51 |
| 7,076,469 B2 * | 7/2006 | Schreiber et al. | 705/57 |
| 7,079,191 B1 * | 7/2006 | Kitamura et al. | 348/552 |
| 7,197,535 B2 * | 3/2007 | Salesky et al. | 709/204 |
| 7,281,272 B1 * | 10/2007 | Rubin et al. | 726/26 |
| 7,305,713 B1 * | 12/2007 | Crance | 726/33 |
| 7,388,605 B2 * | 6/2008 | Obrador | 348/220.1 |
| 7,395,245 B2 * | 7/2008 | Okamoto et al. | 705/59 |
| 7,480,382 B2 * | 1/2009 | Dunbar et al. | 380/217 |
| 7,568,234 B2 * | 7/2009 | Naslund et al. | 726/26 |
| 7,631,184 B2 * | 12/2009 | Ryan | 713/160 |
| 7,792,517 B2 * | 9/2010 | Mowry et al. | 455/410 |
| 8,139,768 B2 * | 3/2012 | Pritchett et al. | 380/228 |
| 2001/0042043 A1 * | 11/2001 | Shear et al. | 705/51 |
| 2002/0056123 A1 * | 5/2002 | Liwerant et al. | 725/87 |
| 2002/0083121 A1 | 6/2002 | Chang et al. | |
| 2002/0140963 A1 | 10/2002 | Otsuka | |
| 2002/0171872 A1 | 11/2002 | Matsunaga | |
| 2003/0088557 A1 * | 5/2003 | Morino | 707/3 |
| 2003/0200459 A1 * | 10/2003 | Seeman | 713/200 |
| 2003/0225700 A1 * | 12/2003 | Lao et al. | 705/51 |
| 2004/0055018 A1 * | 3/2004 | Stone | 725/113 |
| 2004/0128317 A1 * | 7/2004 | Sull et al. | 707/104.1 |
| 2004/0190854 A1 * | 9/2004 | Dunn et al. | 386/46 |
| 2005/0066165 A1 * | 3/2005 | Peled et al. | 713/165 |
| 2005/0081138 A1 * | 4/2005 | Voss et al. | 715/500.1 |
| 2005/0094191 A1 | 5/2005 | Vondran et al. | |
| 2005/0114672 A1 * | 5/2005 | Duncan et al. | 713/182 |
| 2005/0132416 A1 | 6/2005 | Wasilewski | |
| 2006/0064716 A1 * | 3/2006 | Sull et al. | 725/37 |
| 2006/0074992 A1 * | 4/2006 | Kim et al. | 707/200 |
| 2006/0107289 A1 * | 5/2006 | DeYonker et al. | 725/37 |
| 2006/0117379 A1 * | 6/2006 | Bennett et al. | 726/3 |
| 2007/0092079 A1 * | 4/2007 | Cookson et al. | 380/203 |

\* cited by examiner

METHODS AND SYSTEMS TO PROCESS AN IMAGE

FIELD

This application relates to electronic processing, and more specifically to methods and systems to process an image.

BACKGROUND

Set-top boxes are used in conjunction with television sets to provide advanced programming services, such as digital signal decoding, program guides, video-on-demand, and so on. Most recently users have begun to use set-top boxes to capture images from television set displays and to print them on printers. While users have welcomed this added functionality, expanded features and services may be desirable.

BRIEF DESCRIPTION OF DRAWINGS

The present disclosure is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present disclosure. It will be evident, however, to one skilled in the art that the present disclosure may be practiced without these specific details.

According to a first aspect there is provided a method for receiving a request to capture an image that is displayed on a display device associated with a set-top box; storing the image as a first file; and associating the first file that contains the image with a second file that is identified by input received at the set top box from a user. Another aspect is provided in which the second file includes an electronic programming guide (EPG) screen, wherein the EPG screen includes an error message.

According to a second aspect there is provided a method for receiving a request to capture an image that is displayed on a display device that is associated with the set-top box; and communicating the image over a network utilizing a communication service that is provided via the set-top box.

According to a third aspect there is provided a method for receiving a request to adjust a frame that is displayed on a display device that is associated with the set-top box; receiving a request to capture an image that is displayed inside the frame on the display device; and processing the image.

According to a fourth aspect there is provided a method for receiving a request to capture an image displayed on a display device associated with the set-top box; associating the image with a rule; and processing the rule to prevent the image from being printed when the rule prevents the image from being printed.

According to a fifth aspect there is provided a method for communicating content that is received at a set-top box; and communicating a rule to prevent an image, that is captured from the content at the set-top box, from being printed.

Other features of the present disclosure will be apparent from the accompanying drawings and from the detailed description that follows.

In a particular embodiment, a user may capture an image on the display device and use the services and features provided via a set-top box to further process the captured image. For example, a user may utilize a remote control to adjust a frame to capture images on part of a display device rather than capturing all of the images that may appear on the display device. In addition, the set-top box may apply rules to the captured image to restrict the subsequent processing of the image. For example, one may imagine that the copyright of an image may be respected through the use of such rules. In addition, a user may communicate the captured image to a remote device or computer by utilizing a communication service provided by the set-top box. Further, a user may associate the captured image to a file to facilitate subsequent identification of the file by utilizing a browsing service provided by the set-top box. Finally, a user may store the captured image to a storage device that may be directly connected to the set-top box or to a storage device that may be accessed over a network by the set-top box by utilizing a storage service provided by the set-top box.

Figure 1:
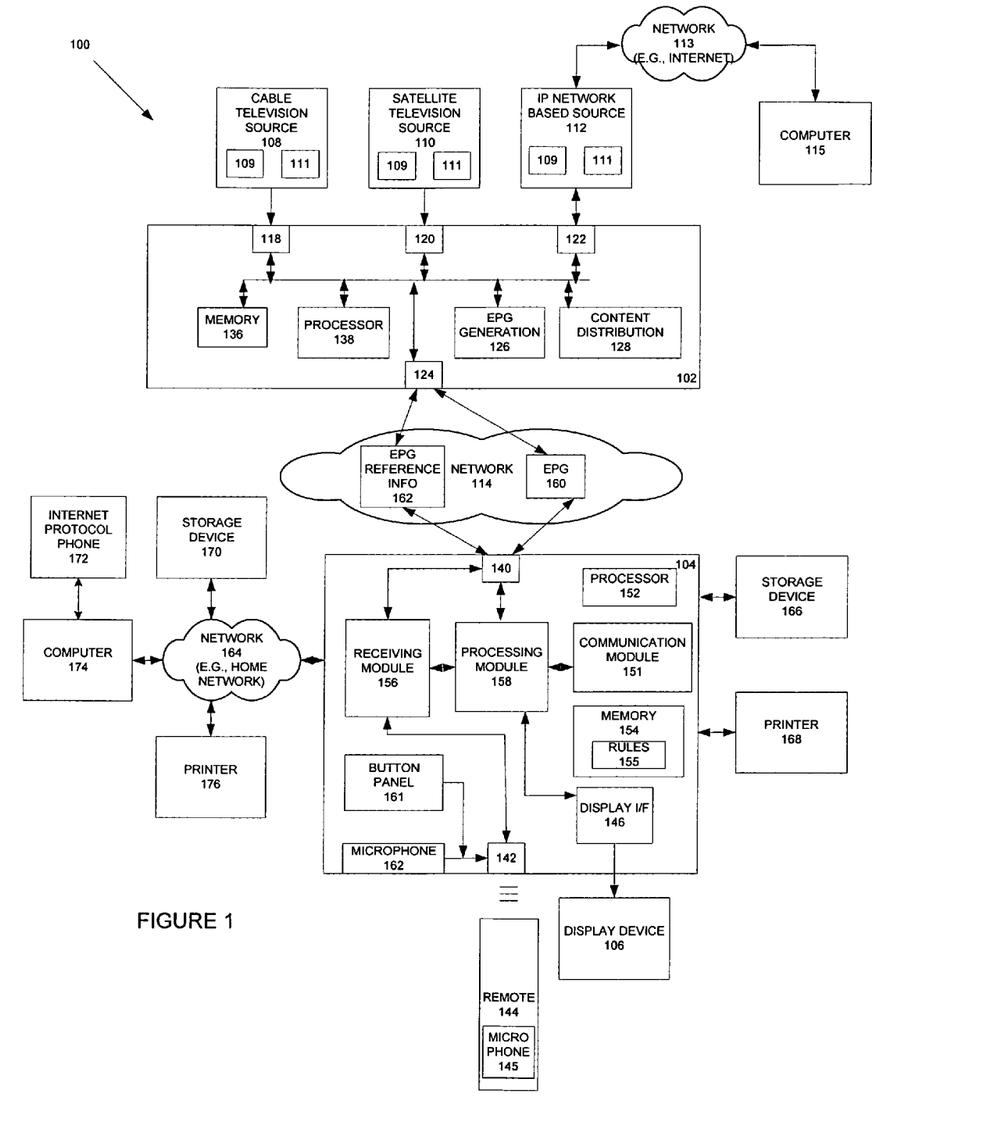
FIG. 1 is a diagrammatic representation of a multimedia distribution system, according to an embodiment of the present disclosure.

Referring to FIG. 1, an example multimedia distribution system 100 is illustrated in accordance with at least one embodiment of the present disclosure. As shown, the system 100 includes a multimedia content provider 102, a set-top box 104, a display device 106, a plurality of multimedia content sources, such as cable television source 108, satellite television source 110, and IP network-based source 112. In the illustrated embodiment, the content provider 102 and the set-top box 104 are connected via a network 114, where the network 114 can include a cable television distribution network, a satellite distribution network, a broadcast television distribution network, a data packet-based computer network (e.g., an Ethernet network), and the like. Likewise, the content sources 108, 110, and 112 may be connected via one or more networks to the content provider 102.

As shown, the content provider 102 can include one or more interfaces 118, 120, and 122 to interface with the content sources 108, 110, and 112, respectively, and an interface 124 to interface with the set-top box 104 via the network 114. The interfaces 118, 120, 122, and 124 may include any of a variety of interfaces, such as a coaxial cable interface, a wireless interface for receiving satellite or broadcast transmissions, or a data packet network interface, such as an Ethernet interface or a router. The IP Network based source 112 is shown to be connected to a computer 115 over a network 113 (e.g., Internet) thereby providing a communication path between a user operating the set-top box 104 and a user operating the computer 115. The content provider 102 further may include an EPG generation module 126 and a multimedia content distribution module 128. The modules 126 and 128 may be implemented as software, hardware, firmware, or combinations thereof. To illustrate, the content provider 102 may include a memory 136 (e.g., static random access memory (SRAM)) and one or more processors 138, where the modules 126 and 128 may be implemented in part or in whole as executable instructions stored in the memory 136 and executed by the processor 138 to perform the techniques described herein.

As also shown, the set-top box 104 may include an interface 140 for interfacing with the content provider 102 via the network 114, a control interface 142 to receive user input and commands, (e.g., via a remote control 144, a button panel 161, a microphone 162) and a display interface 146 to interface with the display device 106. The interface 140 may include any of a variety of appropriate interfaces, such as a coaxial cable interface, a wireless interface to send and receive wireless transmissions, or a data packet-based network interface, such as an Ethernet interface. The control interface 142 may include any of a variety of interfaces, such as an infrared interface, a wireless interface, or the button panel 161. The remote control 144 is shown to include a microphone 145 for receiving voice commands and the set-top box 104 is also shown to include a microphone 162 for receiving voice commands.

The set-top box 104 is further shown to be connected to a storage device 166 (e.g., hard disk, compact disk, floppy, universal serial bus key, etc.) for storing files, a printer 168 for printing files, and a network 164 (e.g., home network). The network 164, in one embodiment, may connect the set-top box 104 to a computer 174 that is connected to an internet protocol phone 172, a storage device 170 for storing electronic files, and a printer 176. The set-top box 104 further may include a processing module 158, a receiving module 156, and a communication module 151. The processing module 158, receiving module 156, and communication module 151 may be implemented as hardware, software, firmware, or combinations thereof. To illustrate, the set-top box 104 may include a memory 154 and one or more processors 152, where one or both of modules 148 and 150 are implemented as executable instructions stored in memory 154 and executed by the processor 152 to implement techniques described herein. The memory is further shown to include rules 155 that may be utilized to control the use of images that may be captured from content that is displayed on the display device 106. For example the rules 155 may embodied as a digital rights management license that may be distributed with content from the content source 108, 110, and 112. As is well known in the art, the license may include rules 155 that may restrict the use of the associated content.

In a particular embodiment, the content provider 102 receives data representative of multimedia channels from each of the different content sources 108, 110, and 112, and provides data representative of at least a subset of the multimedia channels to the set-top box 104 for processing and display at the display device 106 and/or output via an audio device (not shown). In one embodiment, the content provider may include a content module 109 that communicates data that includes content and a control module 111 that may communicate data that includes control information (e.g., digital license) that may include a rule that restricts the use of associated content. Moreover, in a particular embodiment, the content provider 102 may provide data representative of an electronic programming guide (EPG) 160 to the set-top box 104 for processing by the processing module 158 and for navigation by a user via the control interface 142 and the processing module 158. As described herein, the EPG 160, in one embodiment, represents a unified EPG including listings for the multimedia channels provided by two or more content sources that provide multimedia channels to the content provider 102. To illustrate, in a particular embodiment, the EPG 160 represents a navigable program guide or user interface whereby a user, via the remote control 144 or other input device, can direct the processing module 150 to navigate between multimedia channels by selecting an icon or other graphical representation of the desired channel as represented by a graphical display of the EPG 160. The EPG 160 may combine representations of all of the multimedia channels from different content sources in a single list or different lists for different content sources may be displayed concurrently by the EPG 160. Moreover, multimedia channels may be organized within the EPG 160 based on any of a variety of characteristics, such as by the program content of the multimedia channels, where the program content describes the genre or categorization of the video/audio program represented by the multimedia channel. Examples of various genres or categories include a "comedy" genre, an "action" genre, a "family" genre or "children" genre, a "romance" genre, a "science-fiction" genre, and the like.

Figure 2:
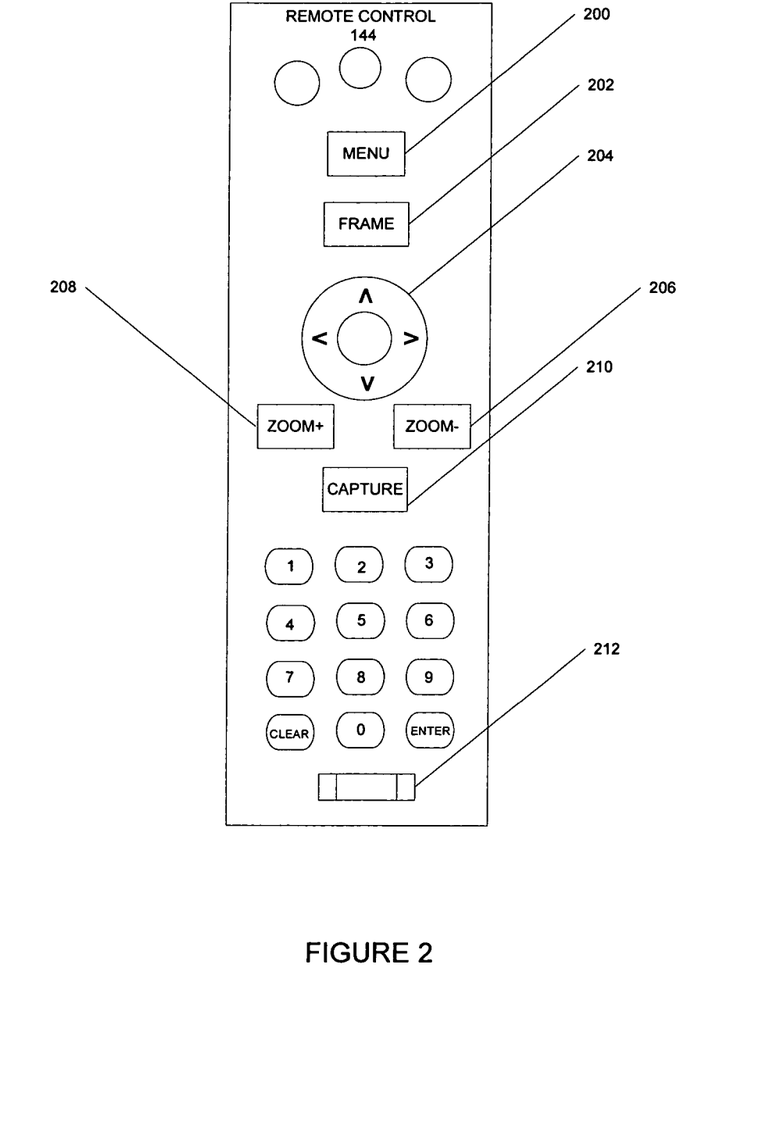
FIG. 2 is a diagrammatic representation of a remote control, according to an embodiment of the present disclosure.

FIG. 2 is a diagrammatic representation of a remote control 144, according to an embodiment of the present disclosure. The remote control 144 is shown to include a menu button 200 for requesting an electronic programming guide menu or user interface on the display device 106, a frame button 202 to display a frame that may be utilized to capture images that appear inside the frame on the display device 106, a direction button 204 that may be used to position the frame on the display device 106, a zoom out button 208 to expand the frame, a zoom in button 206 to contract the frame, a capture button 210 to capture the image that is displayed on the display device 106, and a microphone 212 for receiving voice commands to operate the set-top box 104.

The menu button 200 may be selected by the user to display programming guides from which the user may make selections to operate features and functions provided by the set-top box 104. For example, the user may identify a file (e.g., browsing) that may be associated with a captured image, communicate a captured image, or associate a captured images to files to facilitate subsequent browsing.

The frame button 202 may be selected by the user to make visible a frame that appears on the display device 106 to capture an image that is contained by the frame. The direction button 204 may be selected by the user to adjust or reposition the frame. For example, the frame may be repositioned up, down, to the left or to the right responsive to the selection of the corresponding direction on the direction button 204. In addition, a zoom out button 208 and a zoom in button 206 may be selected by the user to adjust the frame. For example, the zoom out button 208 may be selected to expand the frame thereby capturing a larger area of the display device 106 and the zoom in button 206 may be selected to contract the frame and thereby capture a smaller area of the display device 106.

The capture button 210 may be selected by the user to capture an image that appears inside of the frame on the display device 106. In one embodiment, the image may be frozen on the display device. For example, a user may pause video programming (e.g., a movie) they are viewing and select the capture button 210. In another embodiment, the user may select the capture button 210 without pausing the video programming. It will further be appreciated that the user may utilize the capture button 210 to capture an electronic programming guide or user interface. For example, a user that is encountering an error message on a programming guide may select the capture button 210 to capture the error message. Finally, the microphone 212 may be used by a user to issue voice commands to control the set-top box 104. For example, in one embodiment the user may say, "frame up" to make a frame visible on the display device 106 and move the frame up on the display device 106. It will be appreciated that any selection that is entered via the buttons on the remote control 144 may also be spoken with a corresponding word or phrase.

Adjusting the Frame

Figure 3:
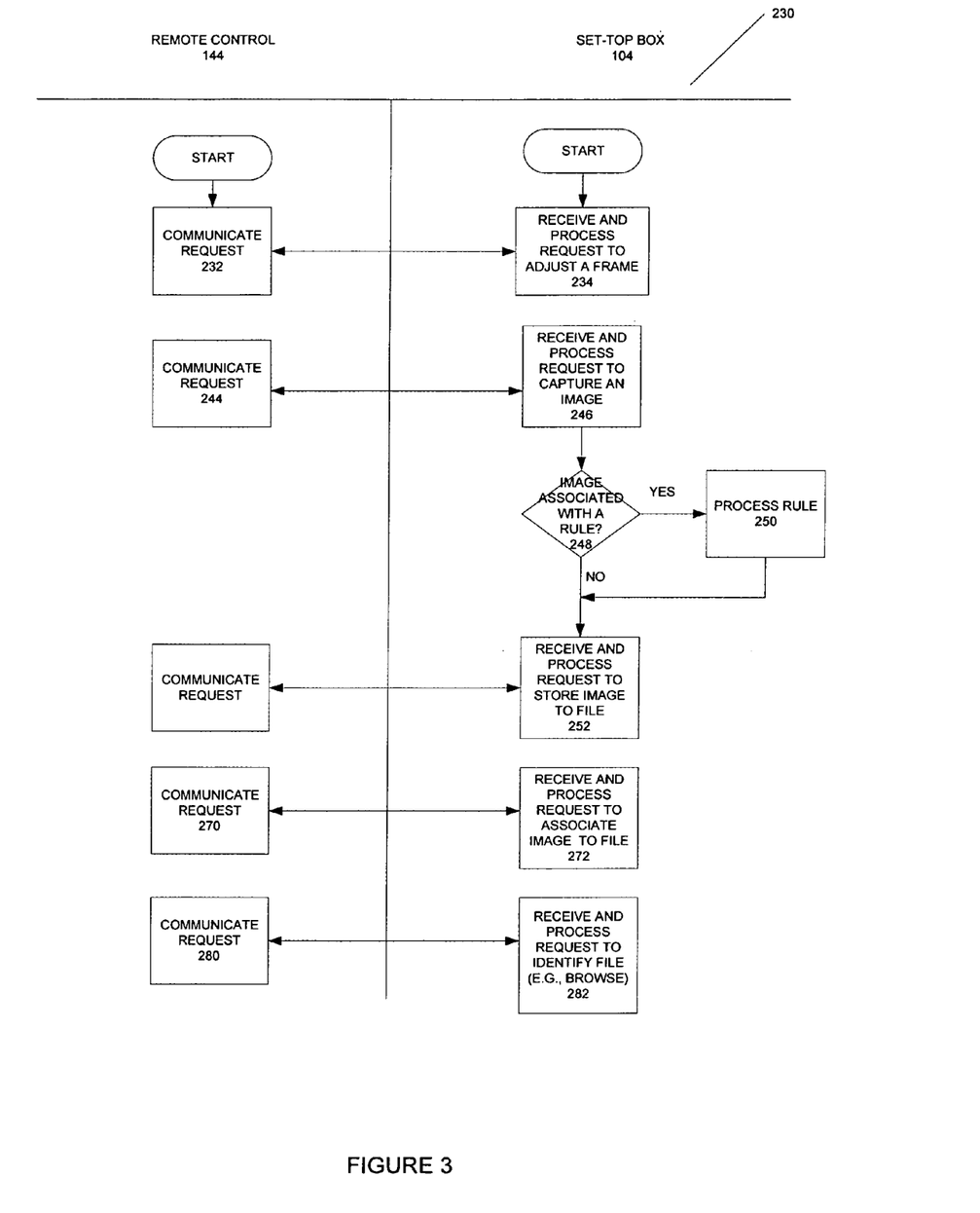
FIG. 3 is a flow chart illustrating methods to process an image, according to an embodiment of the present disclosure.

FIG. 3 is a flow chart illustrating methods 230 to process an image, according to an embodiment of the present disclosure. At operation 232, a user selects the frame button 202 on a remote control 144. Responsive to the selection, the receiving module 156 on the set-top box 104 receives the command (operation 234) and the processing module 150 communicates a frame to the display device 106. The user may utilize the frame to capture an image on the display device 106.

Figure 4:
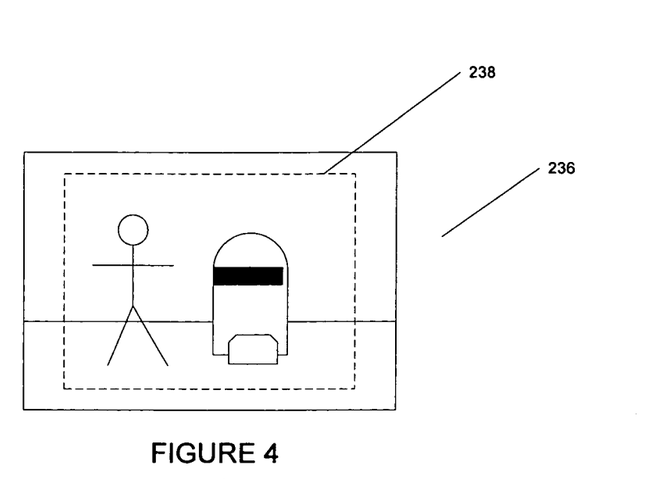
FIGS. 4-6 is a diagrammatic representation of a display device and a frame that is used to capture images on the display device, according to an embodiment of the present disclosure.

FIG. 4 is a diagrammatic representation of a user interface 236, according to an embodiment, that is displayed on the display device 106 responsive to the selection of the frame button 202 by the user. The user interface 236 includes a frame 238 that may be controlled by the user, as previously described. The user may capture a smaller area of the display device 106 by selecting the zoom in button 206 on the remote control 144. Responsive to the selection, the receiving module 156 on the set-top box 104 receives the command and the processing module 150 communicates a contracted frame to the display device 106.

Figure 5:
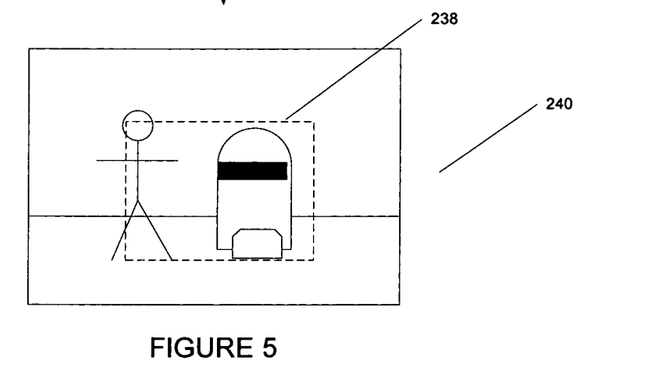

FIG. 5 is a diagrammatic representation of a user interface 240, according to an embodiment. The frame 238 is shown to have been contracted responsive to the selection of the user thereby capturing a smaller area of the display device 106. The user may further want to capture only R2D2 from the display device 106 and accordingly moves the frame to the right by selecting the direction button 204.

Figure 6:
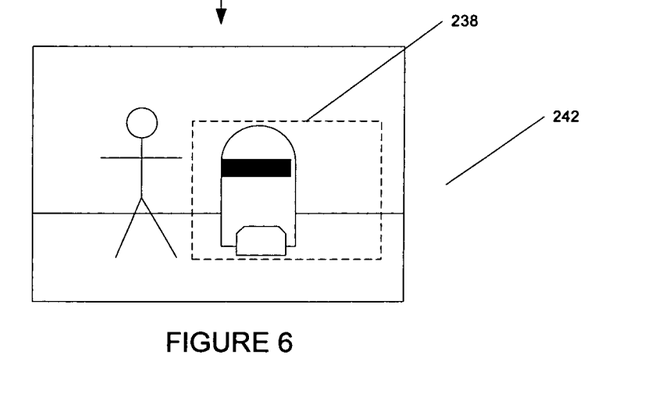

FIG. 6 is a diagrammatic representation of a user interface 242, according to an embodiment. The frame 238 is shown to have been moved to the right responsive to the selection of the user. Thus, the user may adjust the position of the frame and the size of the frame, as it appears on the display device 106, to capture the desired image from the display device 106.

Capturing the Image

Returning to FIG. 3, at operation 244, the user selects the capture button 210 on the remote control 144 which communicates the command to the set-top box 104. At operation 246, the receiving module 156 on the set-top box 104 receives the request to capture the image.

At decision operation 248, the processing module 150 determines if the captured image is associated with a set of rule(s). For example, the processing module 150 may determine that the content presently displayed on the display device 106 may be associated with a set of rules 155 (e.g., digital license, digital rights management technology, etc.) that may be used to control the use of the content (e.g., images captured from the content). In one embodiment, a content module 109, at an IP Network based source 112, may communicate the content and, a control module 111, at the IP Network based source 112, may communicate control information in the form of a digital license that includes rules 155 that may be utilized to restrict the use of the content. If the processing module 150 determines that the image is captured from content that corresponds to a set of rules 155 then processing continues at operation 250.

In another embodiment the content and digital license may be communicated from a cable television source 108 or a satellite television source 110. In yet another embodiment the set of rules 155 may correspond to content that is communicated from a distributor, publisher, or author of content. For example, an image captured from a movie that was made by Paramount Studios may correspond to a set of rules 155 associated with Paramount Studios. In yet another embodiment, a set of rules 155 may correspond to images that are associated with an association that manages the copyright of the image. Further, it will be appreciated by one skilled in the art that multiple sets of rules 155 may correspond to a single image.

At operation 250, the processing module 150 processes the rule. In one embodiment, the rule may include a restriction that limits the manipulation of the captured image. For example, a rule may restrict a user from storing the image to a file but allow the user to print the image on a printer. In another embodiment, the rule may permit the user to store the image to a file, but restrict the location of storage. For example, the user may be limited to storing the file on a particular storage device (e.g., set-top box 104, storage device connected to the set-top box 104, a computer 174 connected to a home network 164 that is connected to the set-top box 104, etc.). Further, the location may be associated with a set of restrictions that limit the use of the file (e.g., prevents copying the file, prevents moving the file, prevents communicating the file, etc.). In one embodiment, the restriction may prevent the image from being communicated in an email or via some other communication service.

Storing the Image in a File

At operation 252, further in response to the selection of the capture button 210, the processing module 150 communicates user interfaces to the display device 106 to enable the user to print the image or store the image in a file.

Figure 7:
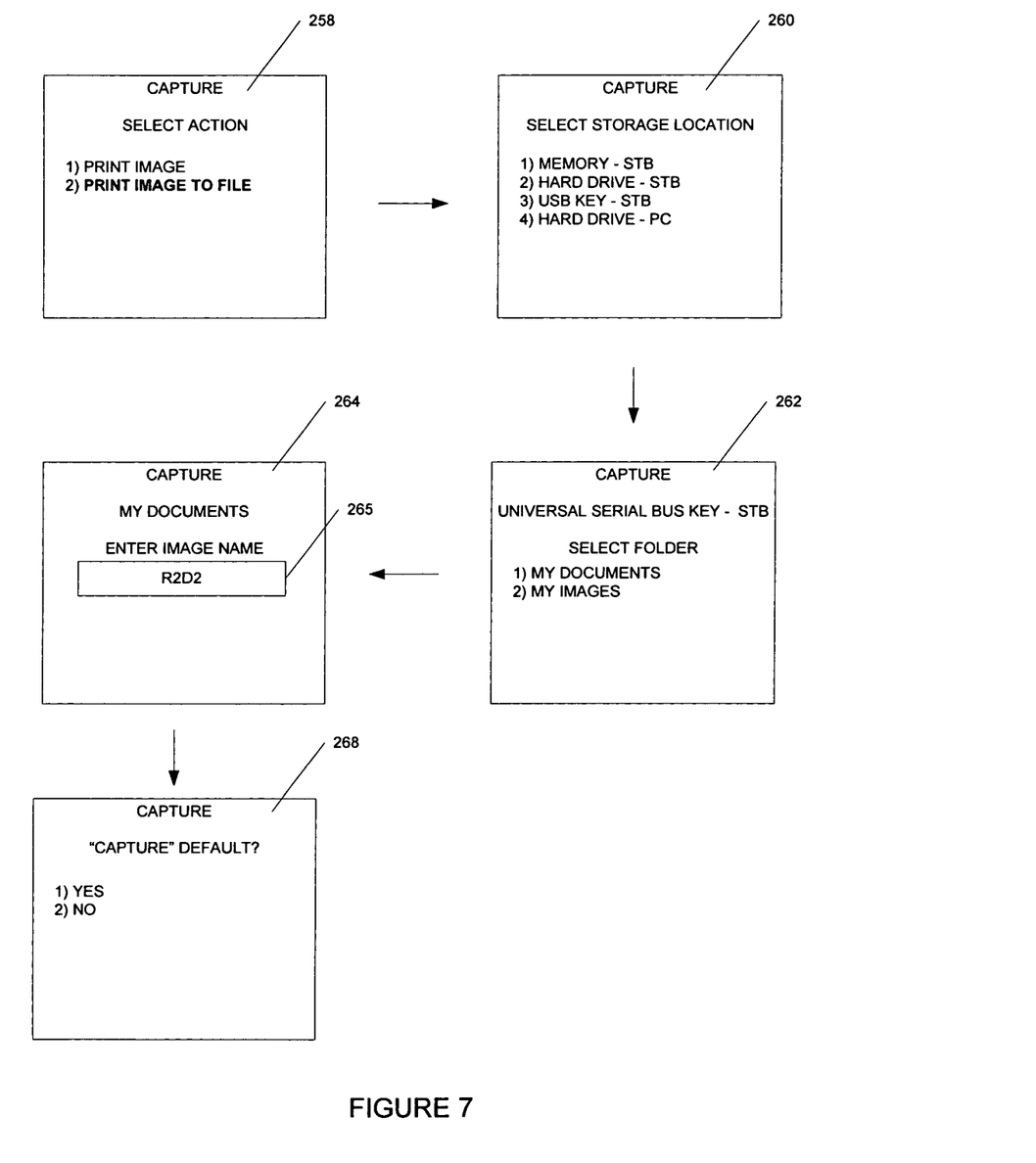
FIGS. 7-11 are user interfaces, according to an embodiment of the present disclosure.

FIG. 7 is a diagrammatic representation of user interfaces 258, 260, 264, 262, and 268, according to one embodiment, to print or store the captured image. The user interface 258 is shown to prompt the user to make a choice. For example, the user may select "one" on the remote control 144 to print the image (e.g., hard copy) or "two" on the remote control 144 to print the image to a file (e.g., store the file). In the present example, the user selects "two" to print the image to a file. Responsive to the selection, the receiving module 156 receives the selection and the processing module 150 displays the user interface 260 prompting the user to select a storage location or device on which to store the file that contains the image. For example, the user may store the file in the memory 154 of the set-top box 104, on a hard drive connected to the set-top box 104, in a universal serial bus key that is connected to the set-top box 104, or in the memory of a computer 174 that is connected over a home network 164 to the set-top box 104, etc. In the present example, the user selects the universal serial bus key that is connected to the set-top box 104 (e.g., #3).

In response to the user selecting universal serial bus key, the processing module 150 may display a user interface 262 on the display device 106, according to one embodiment. The user interface 262 identifies a number of folders on the universal serial bus key. In the present example, the user selects the "My Documents" folder and is prompted with the user interface 264. The user interface 264 includes a box 265 that may be utilized by the user to enter the name of the file. In the present example, the user enters "R2D2" into the box 265 thereby providing a name for the file which contains an image of R2D2.

In response to the user entering a name for the file, the processing module 150 may store the image in a file named "R2D2" and may display a user interface 268, according to an embodiment. The user interface 268 prompts the user to indicate whether the capture button 210 should be defaulted. For example, if the user selects "YES", then a subsequent selection of the capture button 210 may result in automatically storing the captured images to a file in the presently set storage device and storage location (e.g., universal serial bus key on the set-top box, "My Documents" folder). In one embodiment, the name of the new file may be appended with a progressively larger number to ensure unique file names (e.g., R2D2.01, R2D2.02, R2D2.03, etc.).

Associating the Image

Returning to FIG. 3, at operation 270, the user desires to associate the previously saved or stored file (e.g., containing the image of R2D2) to another file and accordingly selects the menu button 200 on the remote control 144. At operation 272, the receiving module 156 on the set-top box 104, receives the menu selection and passes control of the processing module 150.

Figure 8:
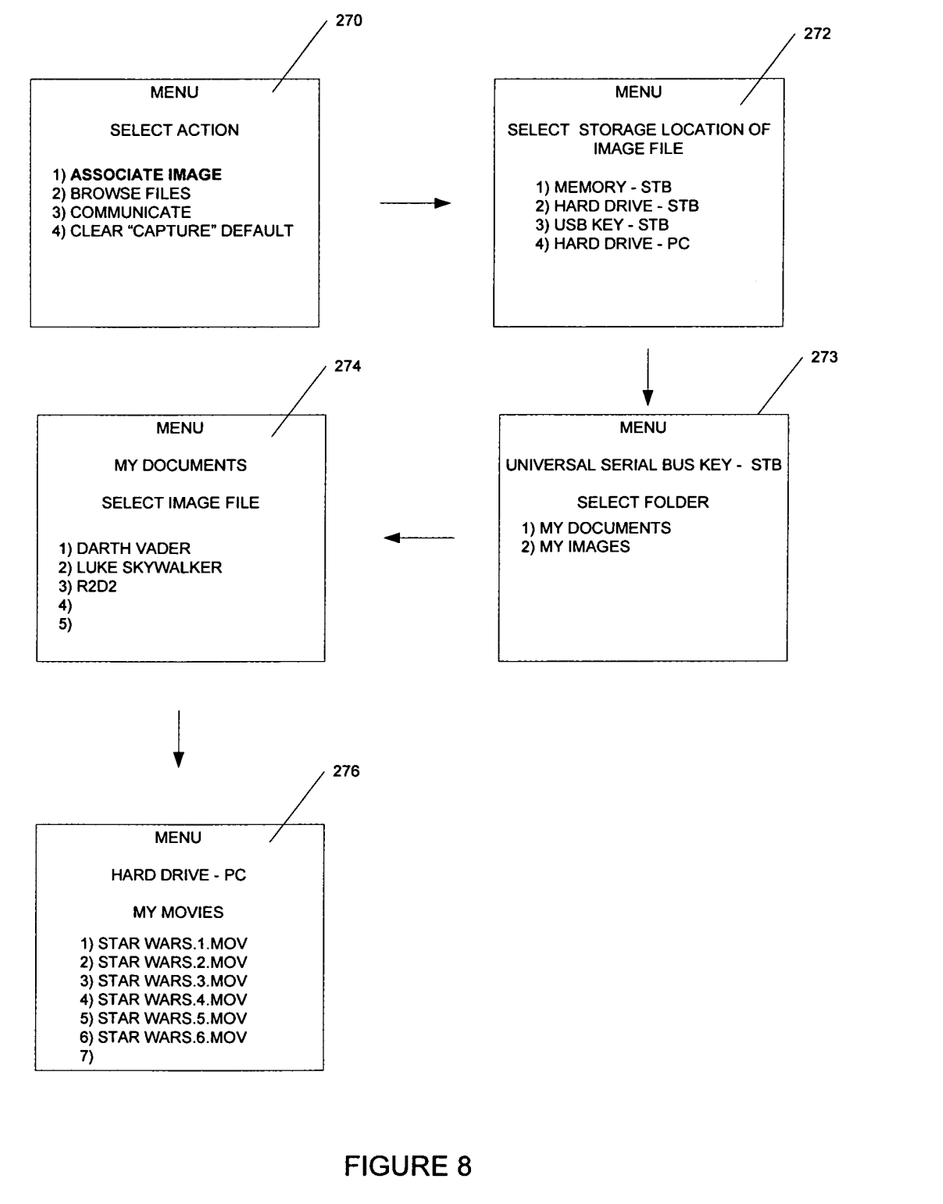

FIG. 8 is a diagrammatic representation of user interfaces 270, 272, 273, 274, and 276, according to one embodiment, to associate the image to a file. The user interface 270, according to one embodiment, enables the user to select an action. In the present example, the user may select "ASSOCIATE IMAGE" to associate a file that contains an image to another file. In response, the receiving module 156 receives the selection and invokes the processing module 158 which communicates the user interface 272 to the display device 106. The user interfaces 272, 273, 274 enable the user to select the location of the device, a folder, and a file that contains the image. In the present example, the user selects a universal serial bus key from the user interface 272, the "My Documents" folder from the user interface 273, and the file named "R2D2" from the user interface 274. In a similar manner the user may select a second file that is to be associated with the "R2D2" file by navigating to a device that is accessible via the set-top box 104, a folder, and a file. For example, from user interface 276, according to an embodiment, the user may select one of six Star War movies from the folder "My Movies." Specifically, the user may form an association by selecting "STAR WARS.5.MOV."

Returning to FIG. 3, at operation 280, the user selects the menu button 200 on the remote control 144 to browse movies or like files that are accessible via the set-top box 104.

Figure 9:
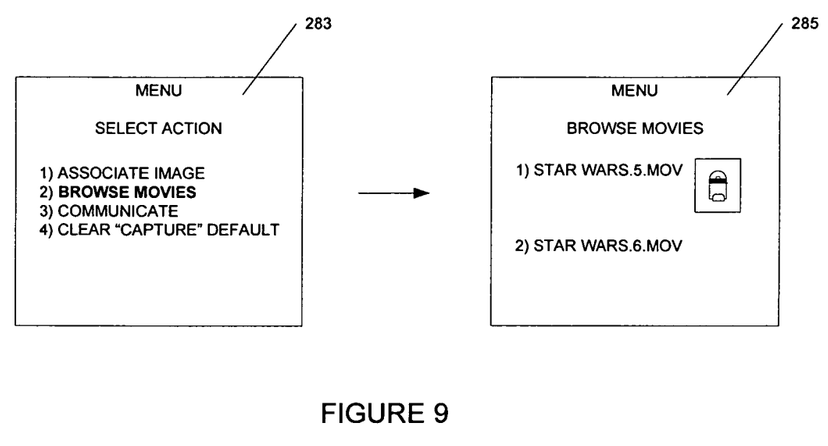

At operation 282, the receiving module 156 receives the menu command and passes control to the processing module 150. The processing module 150 displays a user interface 283, as illustrated on FIG. 9, according to an example embodiment. The user interface 283 presents the users with a choice of selected actions. In the present example, the user may select "BROWSE MOVIES" from the user interface 283 to browse movie files that have been stored on a storage device that is accessible via the set-top box 104. In one embodiment the user may utilize various menus to navigate to a particular device and folder from which to browse files (e.g., movies, snapshots, etc). Responsive to the selection, the receiving module 156, at the set-top box 104, may receive the selection and pass control to the processing module 150 which displays a user interface 285, according to an embodiment. The user interface 285 is shown to display the "STAR WARS.5.MOV" file in conjunction with the image of "R2D2," the image previously captured, stored, and associated. Accordingly, the association of images to files may facilitate easy identification of files when browsing files. Indeed, the images may be captured from the files to which they are associated.

Communicating the Image

In other embodiments, the user may utilize the communication features provided by the set-top box 104 to communicate images. For example, the user may use an email service provided via the set-top box 104 to communicate email to other users on the Internet, the email to include an image that has been captured off the display device 106.

Figure 10:
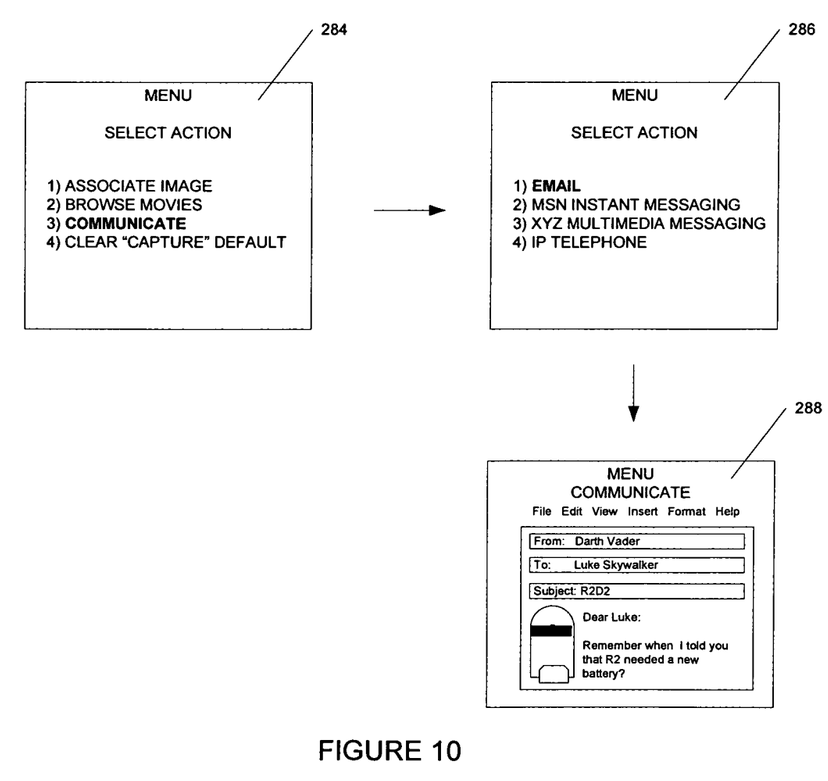

FIG. 10 is shown to include user interfaces 284, 286 and 288, according to an embodiment, that may be used to communicate email that includes images that have been captured from the display device 106. In one embodiment, the user may select the menu button 200 on the remote control 144. Responsive to the selection, the receiving module 156, at the set-top box 104, receives the selection and invokes the processing module 158 which, in turn, communicates the user interface 284 to the display device 106. The process is iterated to communicate successive user interfaces. For example, processing module 158 communicates the user interface 286 to the display device 106 to enable the user to select a communication service. For example, communication services provided via the set-top box 104 may include an email service, an instant messaging service, a multimedia messaging service and an internet telephone communication service. In one embodiment communication services may be provided via a communication module 151 that executes on the set-top box 104. In the present example the user may select "EMAIL" from the user interface 286 to author an email that may be communicated via the network 114 to a content provider 102 which, in turn, may communicate the email to an Internet Protocol Network based source 112 which, in turn, may communicate the email over a network 113 (e.g., Internet) to a computer 115. In the present example, the user has included the snapshot of R2D2, previously captured from the display device 106 in the body of the email. In other embodiments, the image of R2D2 may be included as an attachment to the email.

In the present embodiment, the processing module 158 may interface with a communication module 151 in the form of an email client to enable the user to author an email that includes the image. It will appreciated by those skilled in the art that the set-top box 104 may also operate in the role of a server by facilitating a communication module 151 that serves a file that contains an image in response to a request from a network entity. For example, a network entity may include the computer 115 which may host a client program that communicates a remote request to the set-top box 104 to serve a file that contains an image that has been captured from the display device 106.

Printing the Image

In yet another embodiment, the user may print the image directly to a print device that is accessible via the set-top box 104.

Figure 11:
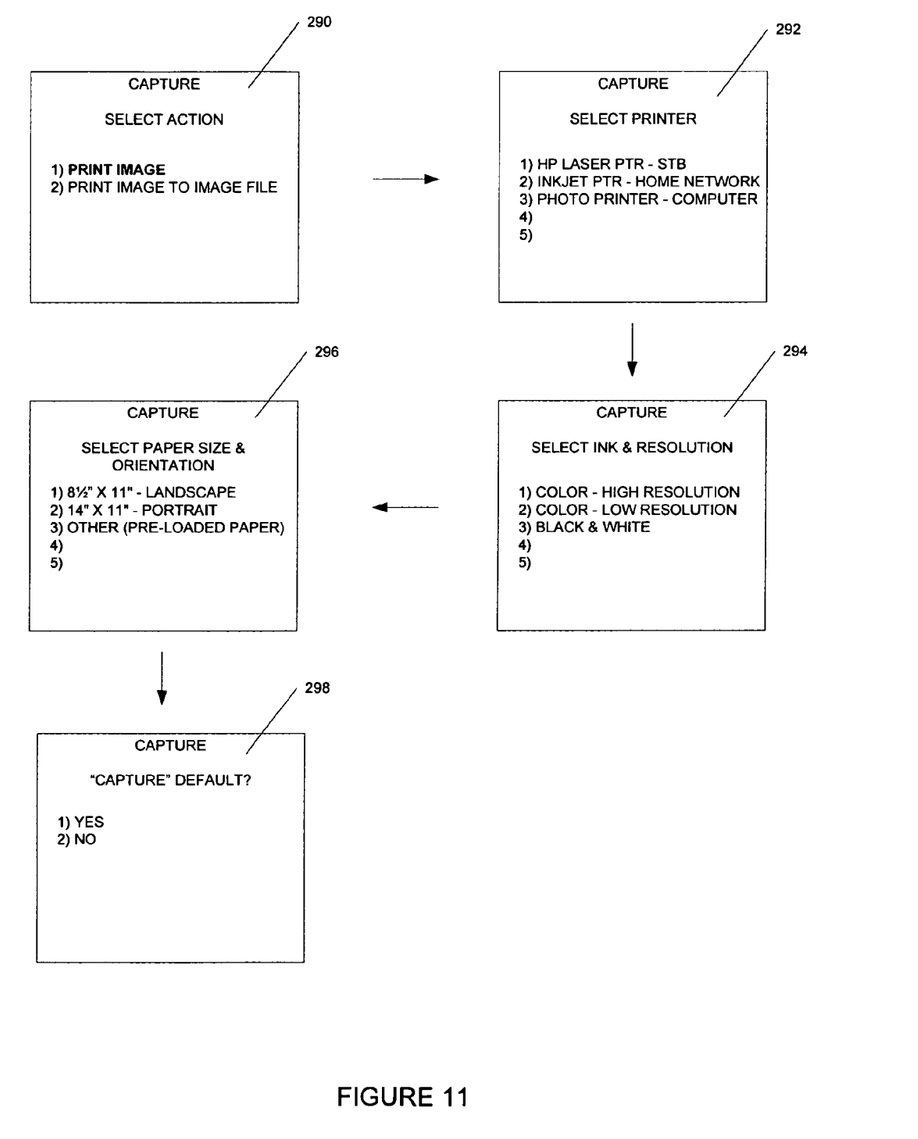

FIG. 11 is shown to include user interfaces 290, 292, 294, 296, and 298, according to an embodiment, that may be used by the to user print an image that has been captured from the display device 106. In one embodiment, the user may select the capture button 210 on the remote control 144. Responsive to the selection of the capture button 210, the receiving module 156, at the set-top box 104, receives the selection and invokes the processing module 158 which, in turn, communicates the user interface 290 to the display device 106. The process is iterated to communicate successive user interfaces. In one embodiment, the user may select "PRINT IMAGE" from the user interface 290 to print the image without first saving the image to file. In response to the selection, the processing module 150 communicates the user interface 292 to the display device 106. The user interface 292, according to one embodiment, prompts the user to select a printer that is accessible via set up box 104. It will be appreciated, that a printer may be connected directly to the set-top box 104, or to a device that is connected to the set-top box via a network 164, 114, 113 (e.g., home network). In response to the user selecting a print device listed on the user interface 292, the processing module 150 communicates a user interface 294 to the display device 106. The user interface 294 prompts the user for a type of ink and a resolution. For example, the user may select "COLOR" or "BLACK & WHITE". In addition, the user may select "LOW RESOLUTION" or "HIGH RESOLUTION." In the present embodiment the user may select combinations of ink and resolutions. Other embodiments may enable the user to select ink and resolution separately or in other combinations. In response to a selection of the ink and resolution, the receiving module 156 receives the selection and the processing module 150 communicates the user interface 296 to the display device 106. The user interface 296 prompts the user to select a paper size, an orientation, or pre-loaded paper. For example, the user may select "LANDSCAPE" or "PORTRAIT" orientation. In addition, the user may select a paper size of 8½"×11" or 14"×11." In the present embodiment the user may select combinations of paper sizes and orientation. Other embodiments may enable the user to select paper size and orientation separately or in other combinations. In response to the user selecting the paper size and orientation from the user interface 296, the receiving module 156 receives the selection and the processing module 150 communicates a user interface 298 to the display device 106. The user interface 298 prompts the user to indicate whether the capture button 210 should be defaulted. For example, if the user selects "YES", then a subsequent selection of the capture button 210 may result in automatically printing the captured images without displaying the previously described user interfaces. The user may clear the default by selecting the menu button 200 on the remote control 144 and selecting "CLEAR "CAPTURE' DEFAULT', for example, as illustrated on user interface 283, FIG. 9.

Figure 12:
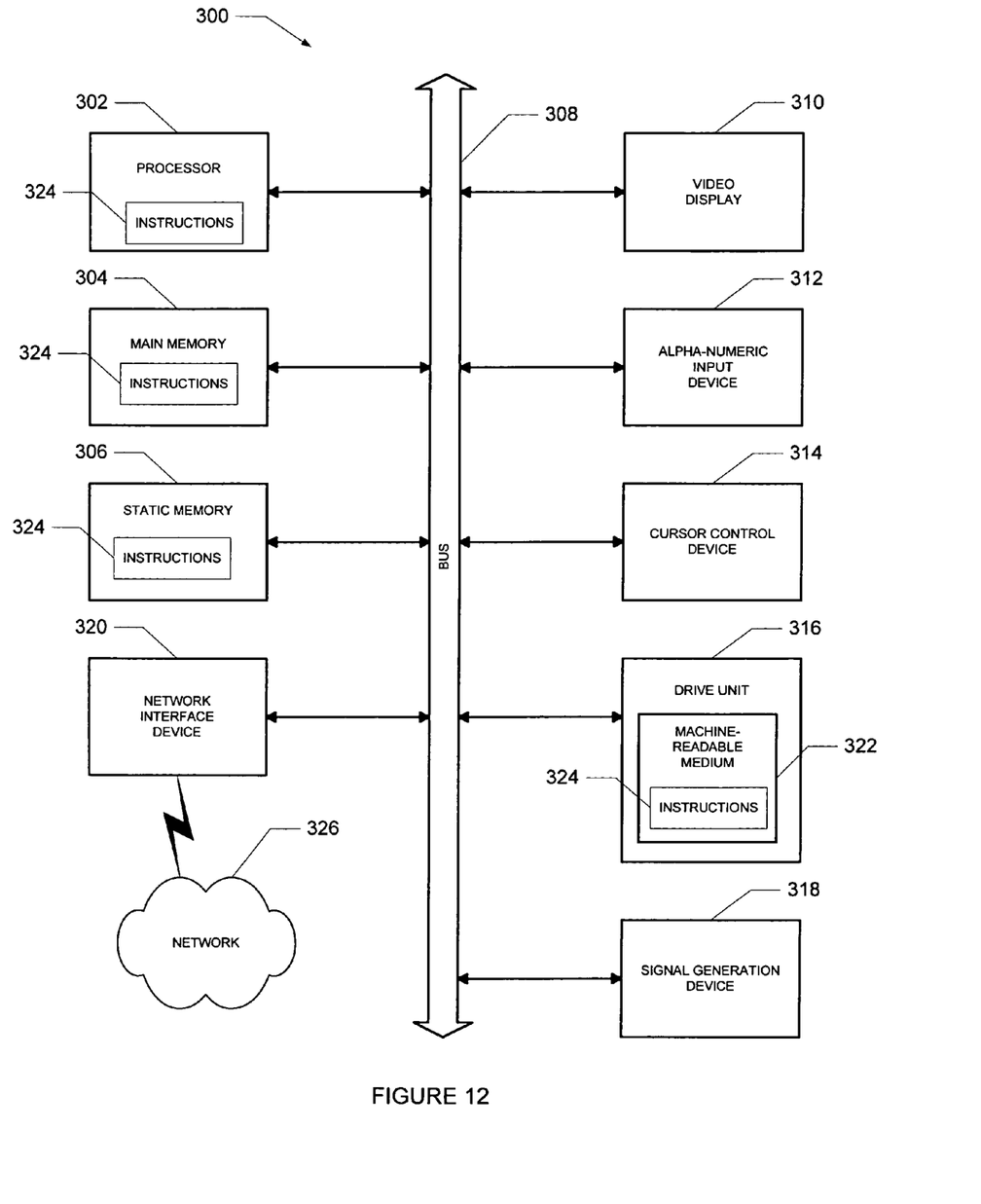
FIG. 12 shows a diagrammatic representation of machine in the example form of a computer system within which a set of instructions, for causing the machine to perform any one or more of the methodologies discussed herein, may be executed, according to an embodiment of the present disclosure.

FIG. 12 shows a diagrammatic representation of machine in the example form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

Although an embodiment of the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

What is claimed is:

1. A method, comprising:
   receiving, by a set top box, from a remote controller controlling operations of the set top box over a wireless interface, a first request to present a frame to enclose a first image displayed on part of a display device coupled to the set top box, the set top box connected to a television distribution network;
   wherein the first image is derived from media content received at the set top box;
   wherein the media content is a video program received at the set top box via a television channel of the television distribution network; and
   wherein the media content includes digital rights management rules to restrict use of images derived from the media content, the digital rights management rules embodied as a digital rights management license distributed with the media content by a content provider;
   adjusting, by the set top box, the frame responsive to a second request received from the remote controller to generate an adjusted frame that identifies a selected image from the first image displayed on part of the display device;
   receiving a third request from the remote controller to capture the selected image identified by the adjusted frame;
   capturing, by the set top box, the selected image in the adjusted frame to form a first captured image responsive to the third request from the remote controller;
   determining, by the set top box, that the first captured image is associated with distribution rules of the digital rights management rules;
   processing the first captured image according to the distribution rules to limit subsequent processing of the first captured image;
   receiving, by the set top box, a fourth request from the remote controller to store the first captured image;

receiving, by the set top box, a fifth request from the remote controller to select a storage location in which to store the first captured image;
receiving a file name entered by a user for the first captured image;
in response to receiving the file name entered by the user for the first captured image, storing the first captured image in the selected storage location with the file name entered by the user;
in response to storing the first captured image, prompting the user to indicate whether future requests for capturing images should be defaulted;
receiving, by the set top box, a sixth request from the remote controller to indicate that future requests for capturing images should be defaulted;
in response to receiving the sixth request from the remote controller to indicate that future requests for capturing images should be defaulted, establishing a default process for storing future captured images to the storage location identified by the fifth request;
receiving, by the set top box, a seventh request from the remote controller to associate the stored first captured image with a file stored in the set top box, wherein content stored in the file differs from the media content from which the first captured image is derived;
associating, by the set top box, the stored first captured image with the file;
generating, by the set top box, a graphical user interface for presenting the stored first captured image in association with the file;
presenting, by the set top box, the graphical user interface, wherein the graphical user interface comprises a display of the stored first captured image with an identifier of the file, to facilitate identification of the file;
receiving, by the set top box, a plurality of subsequent requests from the remote controller for capturing a second image;
capturing, by the set top box, the second image, responsive to the plurality of subsequent requests, to form a second captured image; and
utilizing the established default process for storing future captured images to automatically store, by the set top box, the second captured image at the storage location that is identified by the fifth request without receiving instructions from the remote controller;
wherein a file name of the second captured image is automatically set as the file name entered by the user for the first captured image appended with a number.

2. The method of claim 1, further including communicating, by the set top box, the first captured image to a server utilizing a communication service.

3. The method of claim 2, wherein the communication service comprises an email service, a multimedia messaging service, or an instant messaging service, and wherein an unselected portion of the image that is not enclosed by the adjusted frame is not subject to the distribution rules.

4. A set top box, comprising:
a memory to store instructions; and
a processor coupled with the memory, wherein the processor in response to executing the instructions performs operations comprising:
receiving, from a remote controller controlling operations of the set top box over a wireless interface, a first request to present a frame to enclose a first image displayed on part of a display device coupled to the set top box, the set top box connected to a television distribution network, wherein the first image is derived from media content received at the set top box, wherein the media content is a video program received at the set top box via a television channel of the television distribution network, and wherein the media content includes digital rights management rules to restrict use of images derived from the media content, the digital rights management rules embodied as a digital rights management license distributed with the media content by a content provider;
adjusting the frame responsive to a second request received from the remote controller to generate an adjusted frame that identifies a selected image from the first image displayed on part of the display device;
receiving a third request from the remote controller to capture the selected image identified by the adjusted frame;
capturing the selected image in the adjusted frame to form a first captured image responsive to the third request from the remote controller;
determining that the first captured image is associated with distribution rules of the digital rights management rules;
processing the first captured image according to the distribution rules to limit subsequent processing of the first captured image;
receiving, by the set top box, a fourth request from the remote controller to store the first captured image;
receiving a fifth request from the remote controller to select a storage location in which to store the first captured image;
receiving a file name entered by a user for the first captured image;
in response to receiving the file name entered by the user for the first captured image, storing the first captured image in the selected storage location with the file name entered by the user;
in response to storing the first captured image, prompting the user to indicate whether future requests for capturing images should be defaulted;
receiving a sixth request from the remote controller to indicate that future requests for capturing images should be defaulted;
in response to receiving the sixth request from the remote controller to indicate that future requests for capturing images should be defaulted, establishing a default process for storing future captured images to the storage location identified by the fifth request;
receiving, by the set top box, a seventh request from the remote controller to associate the stored first captured image with a file stored in the set top box, wherein content stored in the file differs from the media content from which the first captured image is derived;
associating, by the set top box, the stored first captured image with the file;
generating a graphical user interface for presenting the stored first captured image in association with the file;
presenting the graphical user interface, wherein the graphical user interface comprises a display of the stored first captured image with an identifier of the file, to facilitate identification of the file;
receiving a plurality of subsequent requests from the remote controller for capturing a second image;
capturing the second image responsive to the plurality of subsequent requests, to form a second captured image; and
utilizing the established default process for storing future captured images to automatically store the second captured image at the storage location that is identified by the fifth request without receiving instructions from the remote controller;

wherein a file name of the second captured image is automatically set as the file name entered by the user for the first captured image appended with a number.

5. The set top box of claim 4, wherein the first captured image is stored in an image file that includes video programming data that was received by the set top box and stored on a storage device.

6. The set top box of claim 5, wherein the video programming data is purchased for viewing and wherein the video programming data is communicated in packets to the set top box from an internet network based source.

7. A system, comprising:
a memory to store instructions;
a processor coupled with the memory, wherein the processor in response to executing the instructions performs operations comprising:
receiving, from a remote controller controlling operations of a set top box over a wireless interface, a first request to present a frame to enclose a first image displayed on part of a display device coupled to the set top box, the set top box connected to a television distribution network, wherein the first image is derived from media content received at the set top box, wherein the media content is a video program received at the set top box via a television channel of the television distribution network, and wherein the media content includes digital rights management rules to restrict use of images derived from the media content, the digital rights management rules embodied as a digital rights management license distributed with the media content by a content provider;
adjusting the frame responsive to a second request received from the remote controller to generate an adjusted frame that identifies a selected image from the first image displayed on part of the display device;
receiving a third request from the remote controller to capture the selected image identified by the adjusted frame;
capturing the selected image in the adjusted frame to form a first captured image responsive to the third request from the remote controller;
determining that the first captured image is associated with distribution rules of the digital rights management rules;
processing the first captured image according to the distribution rules to limit subsequent processing of the first captured image;
receiving, by the set top box, a fourth request from the remote controller to store the first captured image;
receiving a fifth request from the remote controller to select a storage location in which to store the first captured image; receiving a file name entered by a user for the first captured image;
in response to receiving the file name entered by the user for the first captured image, storing the first captured image in the selected storage location with the file name entered by the user;
receiving a sixth request from the remote controller to indicate that future requests for capturing images should be defaulted;
in response to receiving the sixth request from the remote controller to indicate that future requests for capturing images should be defaulted, establishing a default process for storing future captured images to the storage location identified by the fifth request;
receiving a seventh request from the remote controller to associate the stored first captured image with a file stored in the set top box, wherein content stored in the file differs from the media content from which the first captured image is derived;
associating the stored first captured image with the file;
generating a graphical user interface for presenting the stored first captured image in association with the file;
presenting the graphical user interface, wherein the graphical user interface comprises a display of the stored first captured image with an identifier of the file, to facilitate identification of the file;
receiving a plurality of subsequent requests from the remote controller for capturing a second image;
capturing the second image responsive to the plurality of subsequent requests, to form a second captured image; and
utilizing the established default process for storing future captured images to automatically store the second captured image at the storage location that is identified by the fifth request without receiving instructions from the remote controller;
wherein a file name of the second captured image is automatically set as the file name entered by the user for the first captured image appended with a number.

8. The system of claim 7, wherein the processor receives a remote request for a first file from a client, wherein the remote request is received over a data network.

9. The system of claim 7, wherein the processor communicates the first captured image as an attachment to an email, and wherein a communication device communicates the captured image in packets over the Internet.

10. A non-transitory machine readable medium in a set top box for storing a set of instructions that, when executed by the set top box, cause the set top box to perform operations comprising:
receiving, from a remote controller controlling operations of the set top box over a wireless interface, a first request to present a frame to enclose a first mage displayed on part of a display device coupled to the set top box, the set top box connected to a television distribution network, wherein the first image is derived from media content received at the set top box, wherein the media content is a video program received at the set top box via a television channel of the television distribution network, and wherein the media content includes digital rights management rules to restrict use of images derived from the media content, the digital rights management rules embodied as a digital rights management license distributed with the media content by a content provider;
adjusting the frame responsive to a second request received from the remote controller to generate an adjusted frame that identifies a selected image from the first image displayed on part of the display device;
receiving a third request from the remote controller to capture the selected image identified by the adjusted frame;
capturing the selected image in the adjusted frame to form a first captured image responsive to the third request from the remote controller;
determining that the first captured image is associated with distribution rules of the digital rights management rules;
processing the first captured image according to the distribution rules to limit subsequent processing of the first captured image;
receiving a fourth request from the remote controller to store the first captured image;

receiving a fifth request from the remote controller to select a storage location in which to store the first captured image;

receiving a file name entered by a user for the first captured image;

in response to receiving the file name entered by the user for the first captured image, storing the first captured image in the selected storage location with the file name entered by the user;

in response to storing the first captured image, prompting the user to indicate whether future requests for capturing images should be defaulted;

receiving a sixth request from the remote controller to indicate that future requests for capturing images should be defaulted;

in response to receiving the sixth request from the remote controller to indicate that future requests for capturing images should be defaulted, establishing a default process for storing future captured images to the storage location identified by the fifth request;

receiving a seventh request from the remote controller to associate the stored first captured image with a file stored in the set top box, wherein content stored in the file differs from the media content from which the first captured image is derived;

associating the stored first captured image with the file;

generating a graphical user interface for presenting the stored first captured image in association with the file;

presenting the graphical user interface, wherein the graphical user interface comprises a display of the stored first captured image with an identifier of the file, to facilitate identification of the file;

receiving a plurality of subsequent requests from the remote controller for capturing a second image;

capturing the second image responsive to the plurality of subsequent requests, to form a second captured image; and utilizing the established default process for storing future captured images to automatically store the second captured image at the storage location that is identified by the fifth request without receiving instructions from the remote controller;

wherein a file name of the second captured image is automatically set as the file name entered by the user for the first captured image appended with a number.

11. The non-transitory machine readable medium of claim 10, wherein portions of the media content other than the first captured image are not limited by the distribution rules.

12. The non-transitory machine readable medium of claim 10, comprising instructions to prevent the first captured image from being printed in conformance with the distribution rules.

* * * * *